(12) United States Patent
Bhatt et al.

(10) Patent No.: US 8,850,005 B2
(45) Date of Patent: Sep. 30, 2014

(54) SYSTEMS AND METHODS FOR BUSINESS NETWORK MANAGEMENT DISCOVERY AND CONSOLIDATION

(71) Applicants: Ankur Bhatt, Mannheim (DE); Daniel Ritter, Heidelberg (DE); Jürgen Denner, Dudenhofen (DE); Till Westmann, Mountain View, CA (US)

(72) Inventors: Ankur Bhatt, Mannheim (DE); Daniel Ritter, Heidelberg (DE); Jürgen Denner, Dudenhofen (DE); Till Westmann, Mountain View, CA (US)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 14/030,636

(22) Filed: Sep. 18, 2013

(65) Prior Publication Data
US 2014/0019616 A1  Jan. 16, 2014

Related U.S. Application Data

(62) Division of application No. 12/944,006, filed on Nov. 11, 2010, now Pat. No. 8,543,653.

(51) Int. Cl.
*G06F 15/173* (2006.01)
*G06F 15/16* (2006.01)
*H04L 12/26* (2006.01)
*G06Q 10/06* (2012.01)

(52) U.S. Cl.
CPC ............... *H04L 43/04* (2013.01); *G06Q 10/06* (2013.01)
USPC ........... 709/224; 709/206; 709/202; 715/255; 715/234

(58) Field of Classification Search
CPC .................................................. G06F 15/173
USPC .......................................... 709/224, 206, 202
See application file for complete search history.

(56) References Cited

U.S. PATENT DOCUMENTS

| | | | |
|---|---|---|---|
| 6,122,262 A | 9/2000 | Desseignes et al. | |
| 7,725,570 B1 | 5/2010 | Lewis | |
| 7,756,958 B2 | 7/2010 | Nagarajrao et al. | |
| 7,769,757 B2 | 8/2010 | Grefenstette et al. | |
| 8,286,194 B2 * | 10/2012 | Bachhuber-Haller et al. | 719/319 |
| 8,364,615 B2 | 1/2013 | Andersen et al. | |
| 2003/0236842 A1 | 12/2003 | Natarajan et al. | |
| 2005/0216421 A1 | 9/2005 | Barry et al. | |
| 2008/0025295 A1 * | 1/2008 | Elliott et al. | 370/356 |

(Continued)

FOREIGN PATENT DOCUMENTS

WO 2004/081827 A1 9/2004

OTHER PUBLICATIONS

Sandeep Phukan, "sCrawler: SOA Dependency Tracker", Oracle OTN, Jul. 2009, Retrieved form the Internet: URL:http://www.oracle.com/technetwork/articles/scrawler-sandeep-phukan-085368.html, [retrieved on Jan. 3, 2013], 5pgs.

(Continued)

*Primary Examiner* — Jude Jean Gilles
(74) *Attorney, Agent, or Firm* — Buckley, Maschoff & Talwalkar LLC

(57) ABSTRACT

According to some embodiments, a plurality of interconnected entities may be discovered in a network landscape. A subset of the entities may then be automatically consolidated into a business participant, the consolidating may performed in accordance with at least one rule based algorithm. A business process landscape, including the business participant, may then be generated and/or displayed to an operator.

9 Claims, 11 Drawing Sheets

(56) References Cited

U.S. PATENT DOCUMENTS

| | | |
|---|---|---|
| 2008/0066067 A1 | 3/2008 | Stimpson et al. |
| 2008/0130853 A1* | 6/2008 | Silver et al. ............. 379/142.04 |
| 2008/0259930 A1 | 10/2008 | Johnston et al. |
| 2010/0125624 A1* | 5/2010 | Bachhuber-Haller et al. ............................ 709/202 |
| 2010/0250606 A1 | 9/2010 | Vance et al. |
| 2012/0124140 A1 | 5/2012 | Bhatt et al. |

OTHER PUBLICATIONS

European Patent Office, "Communication pursuant to Article 94(3) EPC", dated Jan. 15, 2013, for European Application No. 11007723.7-1238, 8pgs.

"European Communication: European Search Report", dated Dec. 14, 2011, for European Application No. 11007723.7-1238, 9pgs.

* cited by examiner

SYSTEMS AND METHODS FOR BUSINESS NETWORK MANAGEMENT DISCOVERY AND CONSOLIDATION

CROSS-REFERENCE TO RELATED APPLICATION

This is a divisional of co-pending prior U.S. patent application Ser. No. 12/944,006, entitled "SYSTEMS AND METHODS FOR BUSINESS NETWORK MANAGEMENT DISCOVERY AND CONSOLIDATION", filed Nov. 11, 2010, and the content of which are incorporated herein by reference.

FIELD

Some embodiments relate to business network management. More specifically, some embodiments are associated with the discovery and/or consolidation of data and meta-data from multiple sources to create an integration network of systems and applications, integrated with each other, and to describe the interactions between them from a business process perspective.

BACKGROUND

Integration development within an enterprise may require an understanding of existing applications, systems, and/or interfaces to facilitate communication between them in a consistent manner. For example, integration middleware applications may enable Application-to-Application ("A2A") Integration, Business-to-Business ("B2B") Integration, and/or Electronic Data Interchange ("EDI") communications. These middleware applications may let the applications implement Service Oriented Architecture ("SOA") and Event Driven Architecture ("EDA") principals and help orchestrate business processes across different applications within an enterprise. In some customer landscapes, there may also be multiple software instances (from multiple software vendors) performing such tasks. The software instances might, for example, be deployed as a central hub or be embedded within an application system.

To help facilitate integration development, a network may be mapped out by describing the systems and applications in the customer's landscape (including various representations of those systems and application) along with the integrations between them via middleware applications. Creating such a network map or landscape, however, can be a time consuming and error-prone process. For example, the integration middleware applications might not provide an accurate view of the landscape from both a technical and a business perspective. Such a view is not only helpful when operating the network, but may also be needed to implement future changes and/or enhancements of the network.

Accordingly, a method and mechanism for automatically and efficiently determining a business process landscape may be provided in accordance with some embodiments described herein.

DETAILED DESCRIPTION

Integration development within an enterprise may require an understanding of existing applications, systems, and/or interfaces to facilitate communication between them in a consistent manner. For example, integration middleware applications may enable A2A integration, B2B Integration, and/or EDI communications. These middleware applications may let the applications implement SOA and EDA principals and help orchestrate business processes across different applications within an enterprise. In some customer landscapes, there may also be multiple software instances (from multiple software vendors) performing such tasks. The software instances might, for example, be deployed as a central hub or be embedded within an application system.

Figure 1:
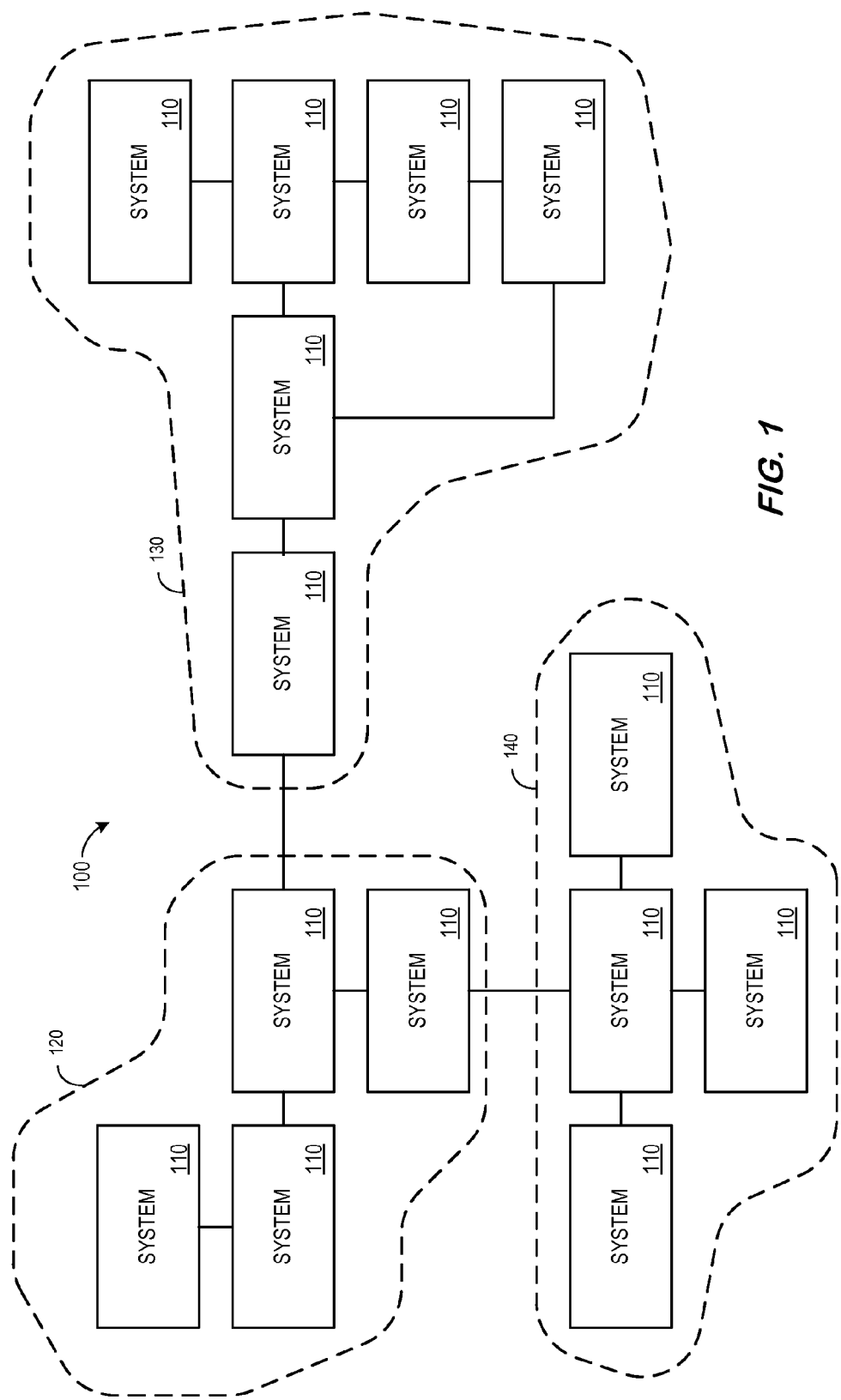
FIG. 1 is a block diagram of a business network management landscape according to some embodiments.

To help facilitate integration development, a network may be mapped out by describing the systems and applications in the customer's landscape (including various representations of those systems and application) along with the integrations between them via middleware applications. For example, FIG. 1 is a block diagram of a business network management landscape 100 according to some embodiments. The landscape 100 includes a number of interconnected systems 110. The systems 110 may comprise, for example, business applications and/or servers that communicate with each other. Note that subsets 120, 130, 140 of the systems 110 may be grouped together in a business sense. For example, one subset 120 might be associated with a headquarters business process while another subset 130 is associated with a distribution center process.

Creating such a network map or landscape 100, however, can be a time consuming and error-prone process. For example, integration middleware applications might not provide an accurate view of the landscape from both a technical and a business perspective. Such a view is not only helpful when operating the network, but may also be needed to implement future changes and/or enhancements of the network.

Figure 2:
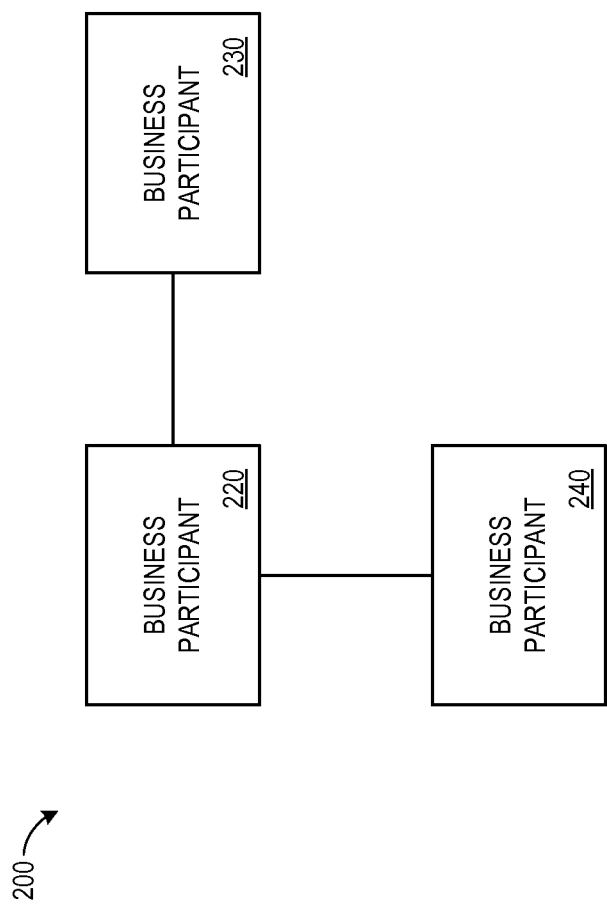
FIG. 2 illustrates business network management landscape in accordance with some embodiments.

According to some embodiments, information about an integration network from is sought from different types of existing (and running) productive systems (e.g., applications and/or middleware) a view of the network may be constructed, in substantially real time, that is up-to date with the day-to-day business processes of an enterprise. An integration network may be defined, for example, as a network of business participants interacting with each other via business applications that are running on physical hardware systems. For example, FIG. 2 illustrates business network management landscape 200 that includes three business participants 220, 230, 240 (e.g., corresponding the subsets 120, 130, 140 of FIG. 1, respectively) in accordance with some embodiments.

According to some embodiments, such an integration network may be automatically constructed for a customer landscape based on information available in existing applications and/or middleware systems. The information might, for example, include some or all of: an application system overview (e.g., associated with an application server or database), product versions, connectivity information, integration running on middleware systems or application systems, interfaces, integration process models, operational data, business process descriptions, business roles and participants, business conversations, and/or business collaborations.

Note that embodiments are not limited to these examples of information. Moreover, in some embodiments a certain amount of operator intervention may be permitted. That is, a network landscape may be "automatically" determined even when an operator provides some of the information (e.g., system names and aliases). Note that the heterogeneity of applications and systems may be a factor when the same information has multiple representations (e.g., because of the usage of that information in different domains. For example, information about a system may have one representation in the applications and middleware systems, another representation for IT operations, and still another representation as a participant for process modeling.

Further note that various tool may provide meta-information that may be used to construct a network landscape. For example, system management tools, IT operations tools, monitoring and IT operations tools, root-cause analysis and incident management tools may each collect monitoring and operational data to let administrators resolve and operate the system. These tools may have some limited discovery-like capability that reads meta-data and operational data or monitors specific applications or systems via runtime agents. Integration middleware (e.g., enterprise application integration, enterprise service bus, and/or SOA applications) may also have design and management tools for content development and operations. These tools may also create meta-data and/or facilitate some discovery of existing information.

Some embodiments provided herein bring source data into a common representation, independent of the various source systems, during a discovery process. A set of rule based algorithms may then be executed in a consolidation process to identify similarity and relationships between this information. The processes may be performed in substantially real time according to some embodiments. Although at any given point in time the integration network may represent a snapshot of a particular state of information sources, the discovery and consolidation processes may be performed continually over time (since the integration network may be constantly evolving as sources are added, removed or changed).

The goals of business network management include easing the end-to-end lifecycle of integration developments and allowing collaboration on different information for faster execution. Accordingly, a useful network landscape may reflect a generalized view of a customer landscape with applications and integration bus/enterprise service buses. Moreover, the view of the network may need to be automatically constructed and to be live up-to-date with real production systems to ensure visibility and transparency of the network.

The process of discovering a network may explore a system landscape using consolidated and source information models and an analysis of information to find similarity and relationships within information. The exploration of the network may start with the integration technology as it acts as an intermediary between applications (and thus has meta-data about the integration endpoints of the application). For applications with proxies and connectivity, the information might include connectivity and interface details and/or operation data. For applications with proxies, connectivity, and mediation the information might include connectivity and interface details, mapping, routing, and/or operation data. For a standalone enterprise service bus or integration server, the information might include connectivity and interface details, mapping, routing, system centric processes, and/or operation data. For applications connecting to a standalone enterprise service bus or integration server, the information might include connectivity and/or operation data. For B2B gateways, the information might include connectivity and interface details, mapping, routing, system centric processes, and/or operation data. For applications connecting to B2B gateways running at a business partner of a company, the information might include connectivity and/or operation data.

Figure 3:
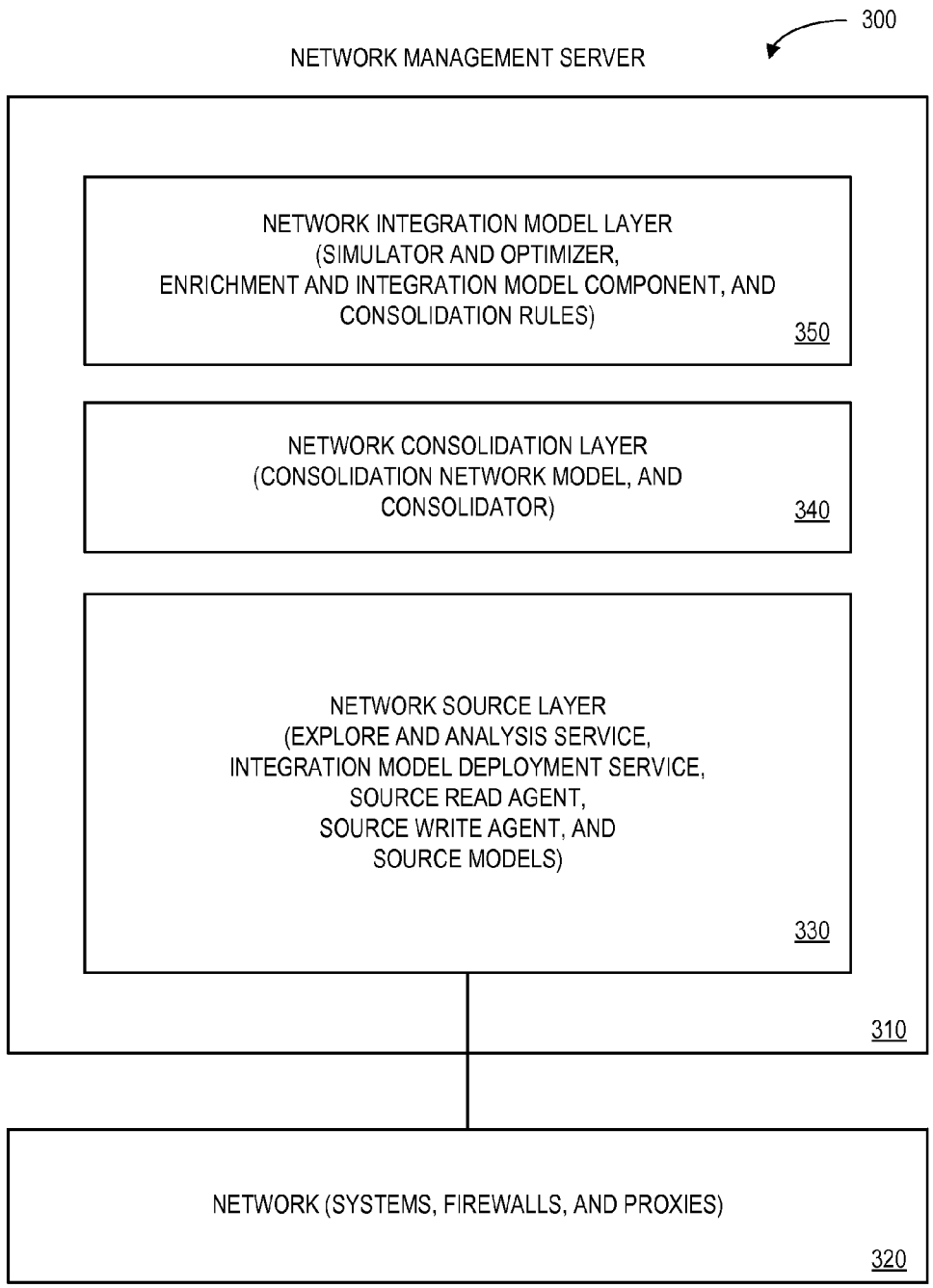
FIG. 3 is a block diagram of a system including a network management server that may explore a network according to some embodiments.

The information may be analyzed to determine the network landscape. For example, FIG. 3 is a block diagram of a system 300 including a network management server 310 that may explore a network 320 according to some embodiments. The network management server 310 may receive information from various systems in the network 320. For example, the network management server 300 might import the input records from a remote system via HyperText Transport Protocol ("HTTP") communication or any other type of data exchange. The network management server 300 and/or systems in the network 320 might be associated with, for example, Personal Computers (PC), servers, and/or mobile devices.

Note that FIG. 3 represents a logical architecture according to some embodiments, and actual implementations may include more or different components arranged in other manners. Moreover, each system described herein may be implemented by any number of devices in communication via any number of other public and/or private networks. Two or more of devices of may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip® disk, magnetic tape, and solid state Random Access Memory (RAM) or Read Only Memory (ROM) storage units. Embodiments are therefore not limited to any specific combination of hardware and software.

A network source layer 330 in the network management server 310 may communicate with systems in the network 320 and provide source model storage, a source read agent, a source write agent, explore and analyze services, and/or an integration model deployment service. The network source layer 330 may represent meta models and operation data accessible via public Application Programming Interfaces ("APIs") of application systems and the integration bus. Source models may describe a particular category of system as accurately as possible and may also be the data model for writing back to the corresponding system. Source models, according to some embodiments, describe only the set of information as relevant for the use cases of business network management and may not provide a complete model overview of a particular system. They might be created, for example, via an explore process using extractors developed for a specific system type and system category. The network source layer 330 may also provide extensions points to hook in new source models.

For a particular system type and system category, the source model may require information from multiple data sources referred to as primary and secondary data sources to provide a holistic view of a particular system. The explore process may extract primary data source for a particular system type and category and may also collect secondary data sources to fill the source models where appropriate. The secondary data sources may include, for example, logs, monitoring data, design time meta-data etc. For constructing the view of the network, the list of unique physical systems participating in the network may also need to be maintained, and the systems itself and software versions running on them forms a source model. Source models may be persisted to allow faster access and to avoid repeated call-backs to system.

A network consolidation layer 340 in the network management server 310 may include a consolidator and/or consolidated network model storage. The network consolidation layer 340 may represent the global, physical one-view of the network. After exploration, an analysis of information may be performed to find matching, similarity and relations to construct an actual view of the network with applications and integration buses deployed on systems integrating with each other. The reason for analysis may be, for example, because of redundancy and incoherence in the source models which may not translate into an automatic and accurate view of the network. The aim of analysis may be to identify integration flows between systems, and therefore create a holistic network view. For example, a set of systems communicating to a particular system in the network might maintain connection details via different names and identifiers. The analysis of such information may result in a list of unique integration flows to the particular system from other systems in the network.

The consolidated network model may be created by an algorithm based analysis of the source models. The algorithms may perform similarity detection and relationship determination across source models and rely on semantics based on ontology, taxonomy and concepts of pattern matching and pattern recognition. In some cases, additional data may need to be added for the analysis process.

A network integration model layer 350 in the network management server 310 may include an enrichment and integration model component, an operation linker, and/or a simulator and optimizer. The network integration model layer 350 may, for example, provide a Graphical User Interface (GUI) that may be used to access and/or adjust business landscapes.

Referring again to the network consolidation layer 340, note that the sets of information that are discoverable on a network, referred to as the source models, may be based on applications and/or integration systems. A source model for an application may represent a productive enterprise application in a customer landscape, and may include information about the hardware system and a version of the application (e.g., the product and software component running on the application server). Applications may also contain integration relevant application meta-data like proxies, interfaces, events, types, configurations, and/or operations data.

Additional meta-data/data that may also be discovered includes, for an enterprise application acting as a participant in integration: a data model (business object and types); an integration model (interfaces, events and types); a communication protocol (connectivity); integration requirements; and/or operations data. For an enterprise application acting as a participant in process, the additional meta-data/data that might be discovered includes: a data model (business object and types); reference data (master data, organizational hierarchy), application logic and conditions (customizing tables, business rules etc.); state transition information (events and activities); a workflow (process models); and/or operations data.

A source model for integration may represent the integration bus system itself (e.g., web methods and/or business connector and content developed/configured on the integration bus on it in a customer landscape). This may include details about the hardware system including messaging grid and integration pipeline (including high availability setup) data. Note that the integration bus itself may contain various types of artifacts, such as: interfaces, events, and types; and integration model including mappings and routing; a communication protocol; integration requirements; operational data like monitoring logs, alerts, etc.; system centric process models; and/or a version of integration content (such as a product and/or software component version).

Figure 4:
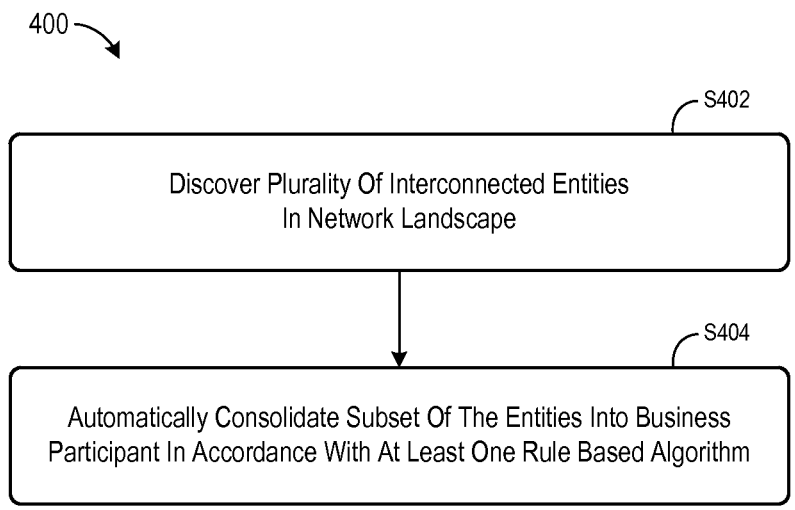
FIG. 4 is a flow diagram of a business network management process in accordance with some embodiments.

FIG. 4 is a flow diagram of a business network management process 400 in accordance with some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S402, a plurality of interconnected entities in a network landscape are discovered. For example, a plurality of systems might be discovered in accordance with any of the embodiments described herein. At S404, a subset of the entities are consolidated into a business participant, wherein said consolidating is performed in accordance with at least one rule based algorithm. According to some embodiments, a business process landscape, including the business participant, may be generated (e.g., for display or transmission).

According to some embodiments, the consolidation of the subset of entities into a business participant is performed based on one or more business "facts." As used herein, the term "facts" may refer to, for example, key sets of attributes that may be relevant for a consolidation algorithm. According to some embodiments facts may be identified based on relevant properties from sources. Note that facts might be machine determined or explicitly specified by an operator (e.g., the operator might be guided to provide information which may or may not be based on existing or already identified properties). By way of example, a fact might represent a system instance name of an application, and an operator might identify that different logical system instance names maintained in separate information sources actually reference the same system instance of the application.

The consolidation performed at S404 may apply a specific set of rules based on the knowledge of one or more information models. The rules may be applied on the facts to create the integration network or landscape. According to some embodiments, the rules are defined by an algorithm for a specific information source and/or may also be provided by an operator. An algorithm may be designed with a concept of "agents" for each information source for discovery and consolidation. The agents may, or may not, be shared across information sources and may facilitate generation of an integration network. The algorithm may also keep references to original information sources to allow drill-down, validation, correction, display and/or any other tasks using the original information source. The algorithm may also apply heuristics to handle dangling references in an integration network, such as an incoming communication to an application (e.g., with no knowledge about who is calling), outgoing communications from an application to an external partner in a network, and/or incoming from (or outgoing) communications to physical resources not directly linked to a business application. According to some embodiments, the algorithm may be fault tolerant and/or apply various semantics for error handling during discovery and consolidation steps (e.g., to help handle changes in the physical world like the unavailability of systems, false data sets or false friends, and/or changes in unique identifiers for an entity).

Figure 5:
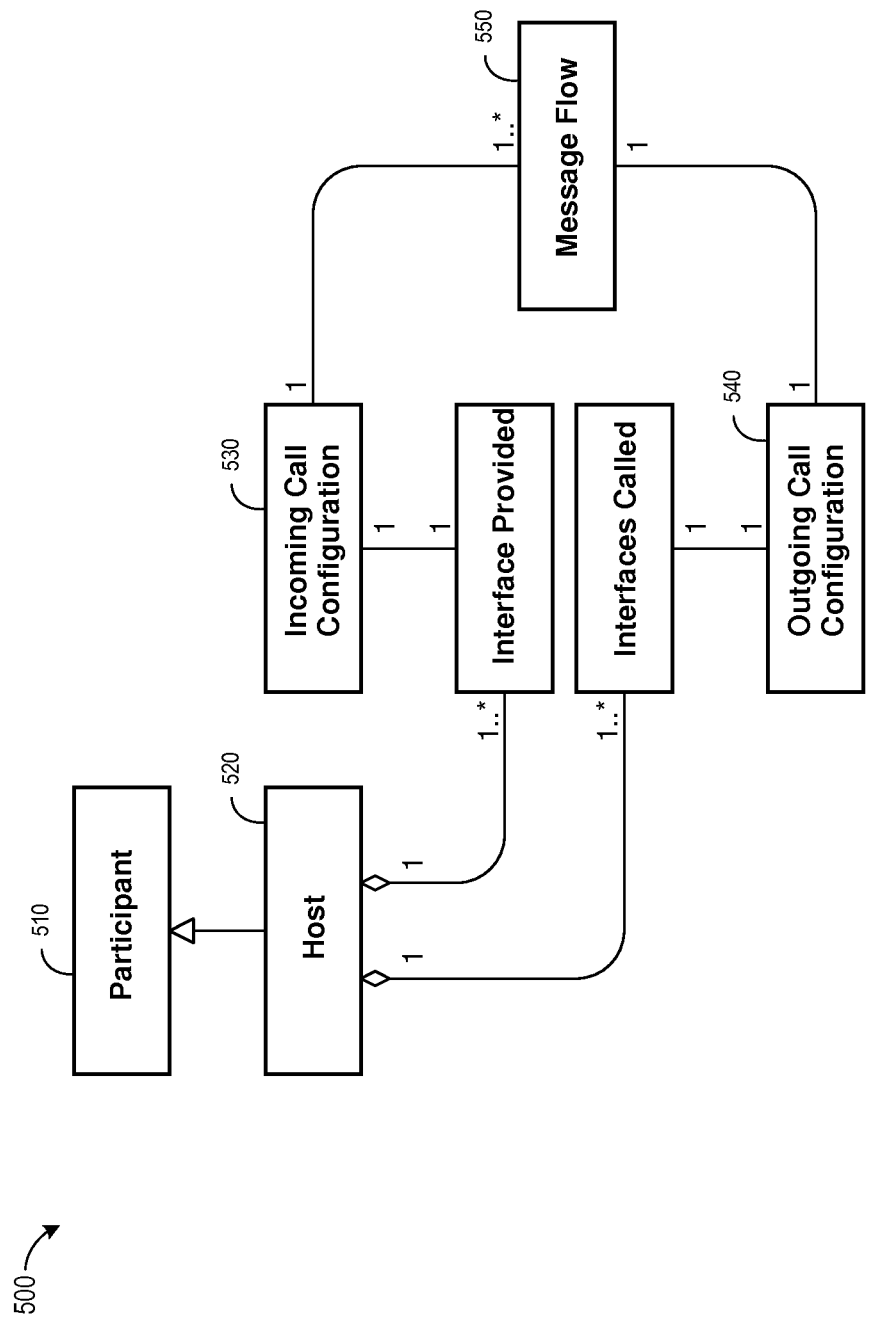
FIG. 5 illustrates a consolidated network model according to some embodiments.

The algorithm may result in the creation of a network model for a landscape. For example, FIG. 5 illustrates a first level view of a consolidated network model 500 according to some embodiments. In this example, a participant 510 may receive information from a host 520. The information may be, for example, associated with an incoming call configuration 530 and an outgoing call configuration 540 communicating via a message flow 550. Note that the actual physical host 520 in the landscape may be associated with the participant 510 and interfaces provided or called by the actual physical host 520 may be found.

Figure 6:
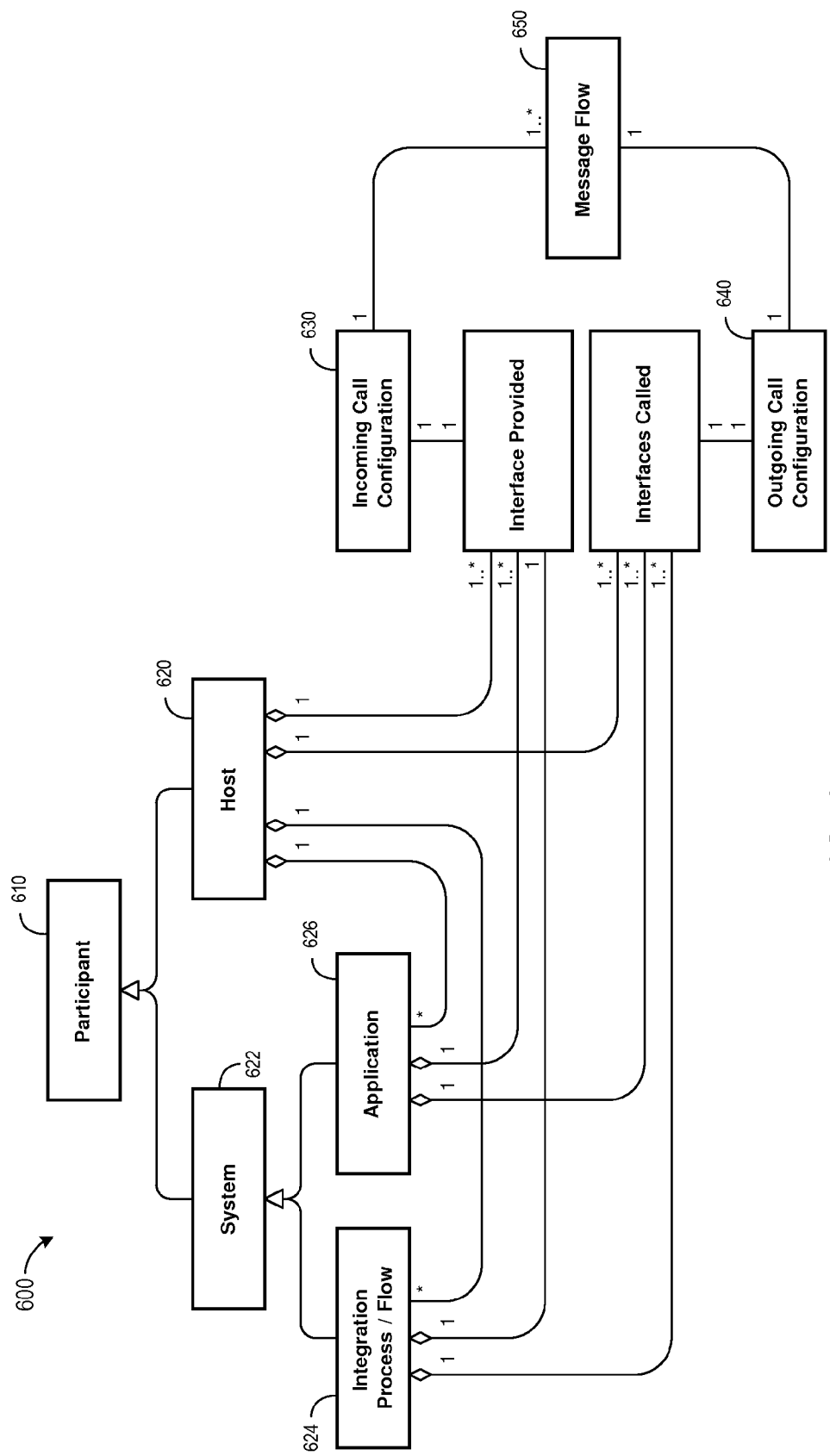
FIG. 6 illustrates another level of a consolidated network model according to some embodiments.

The host 520 itself may be associated with categories and, depending on the categories, it may also be associated applications and integration logic. For example, FIG. 6 illustrates another level of a consolidated network model 600 according to some embodiments. As before, a participant 610 may receive information from a host 620. The information may be, for example, associated with an incoming call configuration 630 and an outgoing call configuration 640 communicating via a message flow 650. According to this level of the model 600, the participant 610 may also receive information from a system 622 associated with an integration process and/or flow 624 and a business application 626. For consolidation, applications and/or integration logic may be unified using the term "system." Note that the level of consolidation illustrated in the model 600 of FIG. 6 extends the model 500 by adding the system 622 deployed on the host 620 that provides and/or consumes interfaces.

An algorithm for creating a consolidated network model may, according to some embodiments, run in multiple steps (e.g., to facilitate parallel analysis allowing the algorithm to scale across large datasets of source models). Moreover, the algorithm may be independent of specific source models and create a view of the network, irrespective of which hosts and systems are available in the network. The consolidator may also coordinate and execute the steps of the algorithm and delegate substantial parts of the analysis to specific explore and analyze components that interact with the source models.

Figure 7:
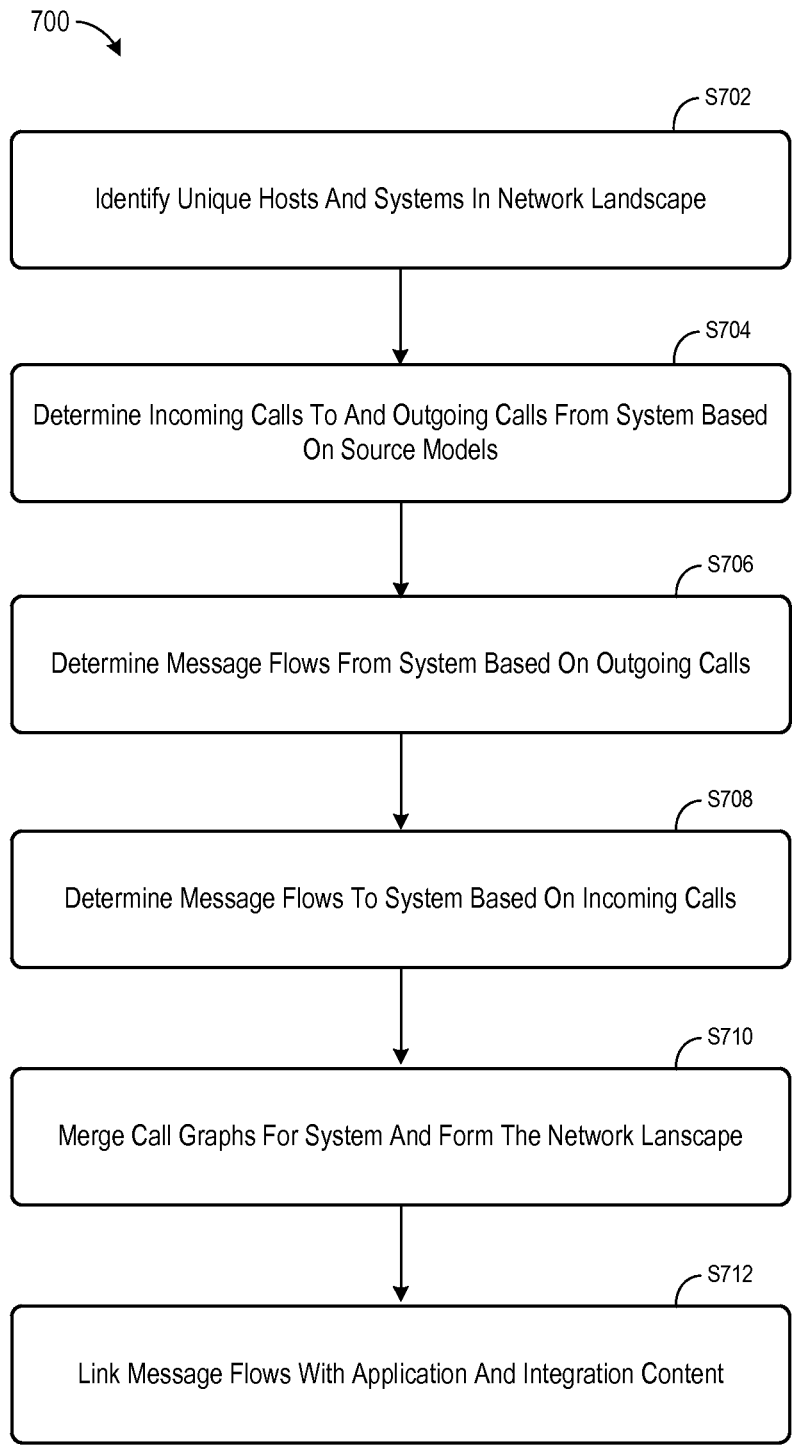
FIG. 7 is a flow diagram of a consolidation process according to some embodiments.

FIG. 7 is a flow diagram of a consolidation process 700 that might be performed, for example, by the network management server 310 of FIG. 3 according to some embodiments. At S402, unique hosts and systems in a landscape may be identified. Note that a network may be based on physical hosts running in a customer landscape. A physical host may be identified, for example, using different identifiers such as a hostname or Internet Protocol ("IP") address. The logical entities that run on hosts may be referred to as systems (e.g., systems identified using system/context dependant identifiers).

The host and/or system information itself (and information about the relationship between hosts and systems) may be fetched from multiple sources and/or stored in different source models. Examples of such sources are the Solution Manager ("SMSY") and System Landscape Directory ("SLD") from SAP®, Open View from Hewlett-Packard®, Tivoli from IBM®, Unicenter from Computer Associates®, and Systems Management Server ("SMS") from Microsoft®. The physical hosts may be registered with the systems management software, for example, for remote management. In some cases, system management software may offer APIs to read and write host and system information via adapters and source read agents may be able to fetch the host and system information and store it as source models.

The hosts and systems may be represented in various source models in different ways, and, as a result, lists of unique hosts and systems may be created within a consolidated network model. Note that there might not be a single universally applicable identification scheme for hosts or systems and no identifiers that are stable over time (e.g., over time, different IP addresses might be used for one DNS hostname and different hostnames might be used for the same IP address). Thus, embodiments may identify hosts and systems using equivalence classes over a set of all possible identifiers. The elements of each equivalence class might comprise all identifiers that are known to identify the same host or system. For example, there might be a host that is identified by the IP address "10.66.145.51", by the DNS name "vml2171.wdf.sap.corp", and by the SAP name "BXI". The equivalence class that identifies this host may then contain all three identifiers and any reference to one of the three identifiers may identify that particular host. While the equivalence class might not be not stable over time, it is possible that at least one of the elements of an equivalence class will not change when another one changes. In this way, identity may be maintained over substantial periods of time in the presence of constant, but gradual, change.

Note that source models may be fetched and kept within a network source layer, allowing for a uniquely identification of a specific instance in the source model. Keeping a copy of source models in the network source layer may also allow for efficient queries on those source models to search for references to host and/or system identifiers. To determine the lineage of a specific piece of discovered information, the discovered information may be annotated with an identifier that refers to the source model that contains the original information.

The process of adding newly discovered information, and removing outdated information, may be continuous. In order to be able to determine which information is relevant (as well as which information is not relevant anymore), each piece of information that is discovered may be annotated with a timestamp. When removing information from models as information on the lower layers (e.g., a source or consolidated model) it may be considered whether or not that information is still referred to on the upper layers (e.g., a consolidated model). For example, if it is determined that a host or system does not exist anymore, it may still need to be maintained (and be marked as unavailable) until it is not referenced anymore.

To formalize the consolidation algorithm, a rule-based approach may be implemented. In this approach, the discovered information may be described by a set of facts and the consolidation algorithm may be described as a set of rules. The rules may, for example, derive new facts from the discovered facts which eventually lead to a consolidated network model.

To identify unique hosts and systems, the network discovery may provide facts for the following predicates (all predicates that are provided by discovery are suffixed by "_disc"):

"host_disc(hostId, URI)" may relate a hostId (e.g., an IP address) to an identifier that refers to the source model that contains information about this host. Homogenous clusters of machines may, according to some embodiments, also be considered as one host. Note that source models from different discovered systems might use different hostIds (e.g., another IP address or a DNS name) and provide different information about the same physical host.

"same_host_disc(hostId1, hostId2)" may connect two hostIds that refer to the same physical host (e.g., an IP address and a DNS name).

"system_disc(systemId, URI)" may relate a systemId to an identifier, such as a Uniform Resource Identifier ("URI"), that refers to the source model that contains information about the system. As used herein, a "system" may refer to a logical entity that could be, for example, an application or an integration system/flow. As for hosts, source models from different discovered systems might use different systemIds and provide different information about the same system.

"same_system_disc(systemId1, systemId2)" may connect two systemIds that refer to the same system.

"runs_on_disc(systemId, hostId)" may connect a system to the host that it runs on. Note that that more than one system can run on one host, but that a system cannot run on more than one host, according to some embodiments.

At S704, incoming to and outgoing calls from a system may be determined based on source models. Note that, based on the source models, it may be possible to identify host and system identifiers and to also query and identify incoming call configurations and/or outgoing call configurations. For many incoming calls to the system, an incoming call configuration may be provided (e.g., such as a sender channel or web service endpoint configurations). For each outgoing call from the system, it may be necessary to maintain the outgoing call configurations to initiate the message flow to the called system (e.g., a receiver channel, web service destinations, and web service logical ports configurations). In some cases, there may be no incoming call configuration required other than the function being remote enabled. In this situation, no configuration might be detected in the source models retrieved from that particular system.

Figure 8:
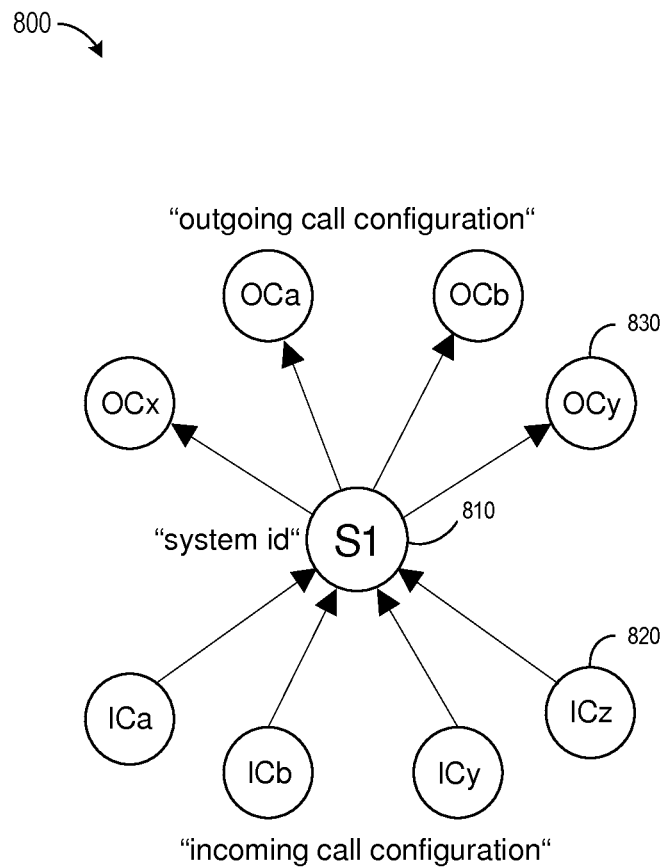
FIG. 8 is a graph illustrating outgoing and incoming calls associated with a system according to some embodiments.

Execution of S704 may result in an outgoing and incoming call graph for a particular system id, such as the graph 800 illustrated in FIG. 8 according to some embodiments. In this example, S1 is the system 810 associated with the "system id" that receives incoming calls from other systems 820 and provides outgoing calls to other systems 830.

For incoming and outgoing call configurations, a network source layer may provide the following facts:

"incoming_disc(systemId, URI)" may relate a systemId to a URI that can be used to retrieve detailed information about an incoming configuration for the identified system.

"outgoing_disc(systemId, URI)" may relate a systemId to a URI that can be used to retrieve detailed information about an outgoing configuration for the identified system (in analogy to incoming_disc).

Figure 9:
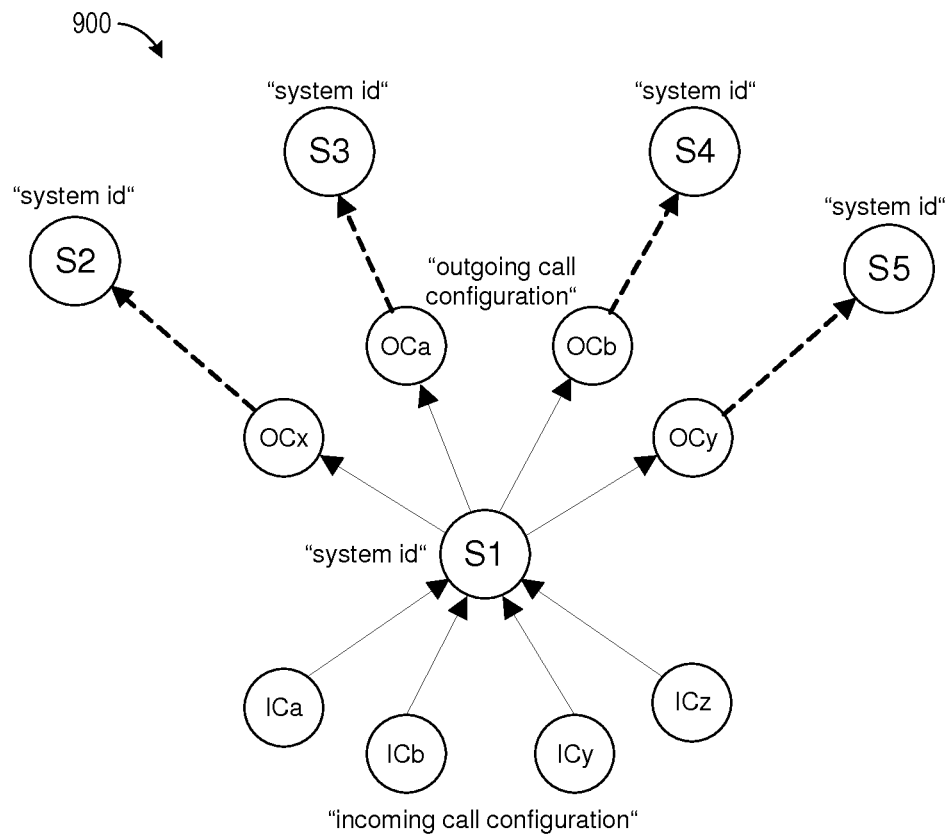
FIG. 9 is a graph illustrating outgoing calls from a system according to some embodiments.

Referring again to FIG. 7, at S706 message flows from a system may be determined based on outgoing calls. That is, outgoing calls may be made to a particular system, and the corresponding call configurations may contain an identifier for the receiving host or system. If available, these identifiers may then be matched against the identifiers that were determined at S702. Otherwise (when no identifiers are available), these call configurations may instead be used at S708. As a result of S706, a call graph may be generated such as the graph 900 illustrated in FIG. 9 (e.g., an extension of a call graph of a system by adding the systems to which outgoing calls are communicating). That is, the graph 800 of FIG. 8 has been expanded (as shown by dashed arrows in FIG. 9) to include systems S2 through S5 based on outgoing call configuration information.

To relate outgoing call configurations to receivers, a network source layer may provide the following facts:

"receiver_disc(URI, systemId)" may relate a URI for an outgoing configuration to a systemId that identifies a receiving system (and the systemId may be extracted from the given configuration).

"receiver_host_disc(URI, hostId)" may relate a URI for an outgoing configuration to a hostId that identifies a receiving host. This may be similar to receiver_disc. But, as some outgoing configurations (e.g., for web services) only specify a receiving host, a receiving system might not always be directly determined. A communication between a calling system and a called system may be referred to as a "message flow." If an outgoing call configuration contains an identifier for a receiver, then there may be corresponding outgoing_disc and receiver_disc facts that both refer to the URI that identifies this outgoing call configuration. Therefore, a message flow may be determined by joining these facts on the URI.

"message_flow(systemIdsender, systemIdReceiver)" and "message_flow_host(hostIdSender, hostIdReceiver)" may determine the message flows between systems and hosts. Message flows between systems may be, for example, determined using the URI of the call configuration.

Figure 10:
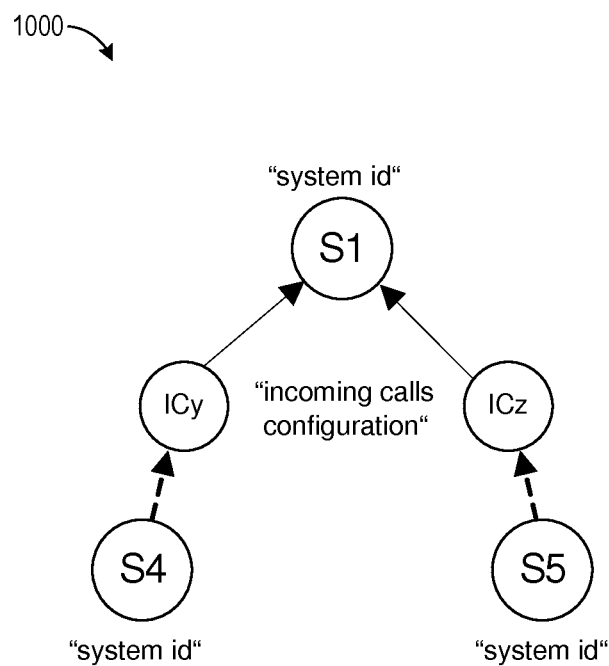
FIG. 10 is a graph illustrating systems communicating according to some embodiments.

At S708, message flows to a system may be determined based on incoming calls. Note that incoming call configurations may also sometimes identify a specific sending host or system. If available, such an identifier can be matched against the identifiers that were determined at S702. While may be common to find a receiver in an outgoing configuration, it may be less common that a specific sender is specified in an incoming configuration. Therefore, is may be expected that more outgoing/receiver pairs than incoming/sender pairs will be discovered. S708 may an extension to the call graph of a system by adding the systems from which incoming calls are received as illustrated by the graph 1000 of FIG. 10. That is, the graph 1000 has been extended (as illustrated by the dashed arrows of FIG. 10) to now include systems S4 and S5 based on incoming call configuration information.

To relate incoming call configurations to senders the network source layer may provide the following facts:

"sender_disc(URI, systemId)" may relate a URI for an incoming configuration to a systemId that identifies a sending system.

Analogously to S706, if an incoming call configuration contains an identifier for a sender, then there may be corresponding incoming_disc and sender_disc facts that both refer to the URI that identifies this incoming call configuration. Therefore a message flow may be determined by joining these facts on the URI:

At S710, call graphs for a system may be merged to form a network. Note that S702 through S708 identified unique hosts and systems and determined message flows that could be derived from information that is available on a single discovered system. To determine more message flows between hosts and systems, already identified incoming and outgoing call configurations from different discovered systems may be matched. This may be done, for example, by matching compatible protocols, matching compatible message types, etc.

Figure 11:
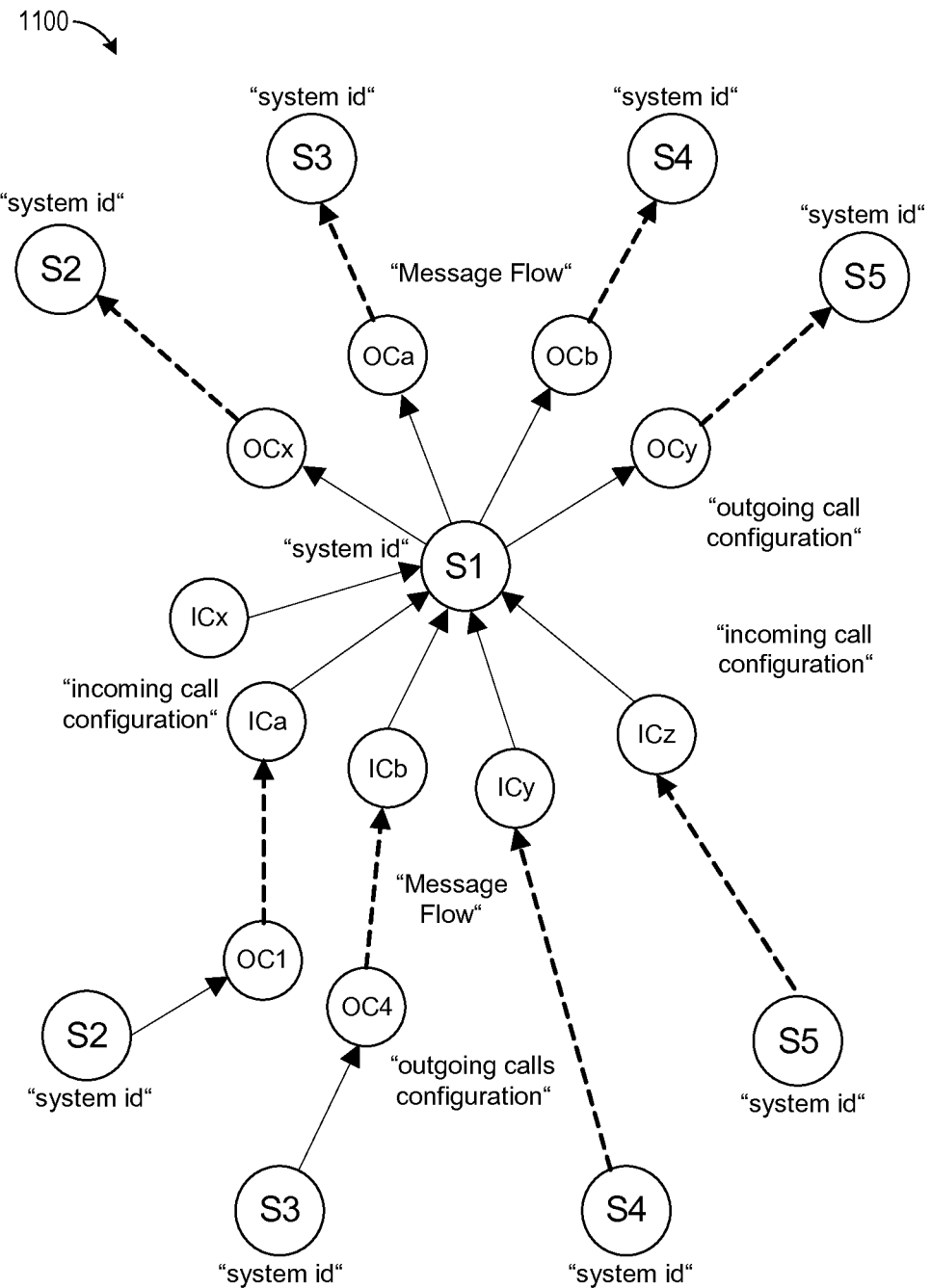
FIG. 11 is a merged graph associated with a system in accordance with some embodiments.

In some cases, an incoming call configuration may not match to the already identified outgoing call configurations (e.g., a web service endpoint is configured on an application system but does not have a corresponding web service destination on any of the systems in the landscape or a database adapter may be configured on an integration bus for reading data from a database but there are no specific configurations on the system where database itself is installed for this read operation). There may also be existing outgoing call configurations for which no corresponding incoming call configuration can be determined (e.g., a destination to the system does not have a corresponding incoming call configuration). Such configurations may remain in the consolidated model in accordance with some embodiments. After determining new message flows, new links may be created between the graphs. The new links and the maintained "unlinked" configurations may result in a graph such as the graph 1100 of an entire business process landscape as illustrated in FIG. 11.

At S712, message flows may be linked with application and integration content. The outgoing and incoming call configurations with the hosts and systems may result in a view of the network. These message flows, however, may only include communication between hosts and systems. The outgoing and incoming call configurations may also have a link to application and integration content deployed and running on the systems. Thus, S712 may determine this link inside the host and systems. The category of systems may determine the source models, and hence may define the link that can be determined.

For example, in case of application hosts and systems, S712 may determine for a particular outgoing or incoming call configuration the link to a particular application proxy, and via the proxy, to the application itself. Note that this determination may be helpful because a particular host may have multiple applications running at the same time. Further, depending on inherent structure of the application, there may be process steps that trigger outgoing calls while other steps receive incoming calls (which can also be analyzed, if possible, based on application source models and operational data such as logs and/or traces).

In case of an integration bus/enterprise service bus/B2B gateway, S712 may determine, for a particular incoming call configuration, a link to a particular or set of outgoing call configurations. This may, for example, translate to the integration process or integration flow deployed, configured and executed on the integration bus when it receives the message. Again, depending on the integration content source models and operational data like logs and traces, it may be possible to trace the path of the message through the integration bus. This analysis may, for example, link incoming calls with outgoing calls and determine the in-between details as much as possible.

Thus, embodiments may provide an efficient and automatic network landscape that may be useful to both IT administrators and business participants.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A non-transitory, computer-readable medium storing program code executable by a computer to perform a method, said method comprising:

identifying a plurality of unique hosts and systems in a landscape of interconnected systems;
determining incoming to and outgoing calls from each system based on source models;
determining message flows from each system based on outgoing calls;
determining message flows to each system based on incoming calls;
merging call graphs for the systems to create a business process network of the landscape; and
linking message flows, application content, and integration content for the business process network.

2. The medium of claim 1, wherein said identifying is associated with a source model.

3. The medium of claim 1, wherein the determination of incoming calls is based at least in part on incoming call configuration information.

4. A method comprising:

identifying, by a computer, a plurality of unique hosts and systems in a landscape of interconnected systems;
determining, by a computer, incoming to and outgoing calls from each system based on source models;
determining, by a computer, message flows from each system based on outgoing calls;
determining, by a computer, message flows to each system based on incoming calls;
merging, by a computer, call graphs for the systems to create a business process network of the landscape; and
linking, by a computer, message flows, application content, and integration content for the business process network.

5. The method of claim 4, wherein said identifying is associated with a source model.

6. The method of claim 4, wherein the determination of incoming calls is based at least in part on incoming call configuration information.

7. Apparatus comprising:

a network management server that includes a computer and is to:
identify a plurality of unique hosts and systems in a landscape of interconnected systems;
determine incoming to and outgoing calls from each system based on source models;
determine message flows from each system based on outgoing calls;
determine message flows to each system based on incoming calls;
merge call graphs for the systems to create a business process network of the landscape; and
link message flows, application content, and integration content for the business process network.

8. The apparatus of claim 7, wherein said identify is associated with a source model.

9. The apparatus of claim 7, wherein the determine incoming calls is based at least in part on incoming call configuration information.

* * * * *